United States Patent
South

(10) Patent No.: US 7,109,134 B2
(45) Date of Patent: Sep. 19, 2006

(54) FUSIBLE QUILT BATT

(75) Inventor: Robert J. South, Hamilton, OH (US)

(73) Assignee: L&P Property Management Company, South Gate, CA (US)

(*) Notice: Subject to any disclaimer, the term of this patent is extended or adjusted under 35 U.S.C. 154(b) by 190 days.

(21) Appl. No.: 10/712,462

(22) Filed: Nov. 13, 2003

(65) Prior Publication Data

US 2004/0152383 A1 Aug. 5, 2004

Related U.S. Application Data

(63) Continuation-in-part of application No. 09/873,597, filed on Jun. 4, 2001, now abandoned.

(51) Int. Cl.
- B32B 7/08 (2006.01)
- B32B 7/12 (2006.01)
- B32B 27/12 (2006.01)

(52) U.S. Cl. ............ 442/150; 112/117; 428/200; 428/343; 428/347; 442/59; 442/149; 442/152; 442/154; 442/164; 442/167; 442/415; 442/416

(58) Field of Classification Search .......... 442/149, 442/150, 151, 59, 152, 154, 164, 167, 415, 442/416; 112/117; 428/200, 343, 347
See application file for complete search history.

(56) References Cited

U.S. PATENT DOCUMENTS

| | | | |
|---|---|---|---|
| 2,364,001 A | 11/1944 | Schieman | 154/43 |
| 3,333,280 A | 8/1967 | Hynek et al. | 2/143 |
| 3,364,063 A | 1/1968 | Satas | 117/98 |
| 3,547,738 A | 12/1970 | Matias et al. | 156/492 |
| 3,794,554 A | 2/1974 | Caring | 161/109 |
| 3,853,595 A | 12/1974 | Pedginski et al. | 117/68.5 |
| 3,922,418 A * | 11/1975 | Lauchenauer | 428/196 |
| 3,996,083 A | 12/1976 | Morgan et al. | 156/92 |
| 4,124,424 A | 11/1978 | Preston | 156/155 |
| 4,299,871 A | 11/1981 | Forsch | 428/104 |
| 4,386,980 A | 6/1983 | Fitzpatrick et al. | 156/63 |
| 4,508,582 A | 4/1985 | Fink | 156/93 |
| 4,555,428 A | 11/1985 | Cole | 428/102 |
| 4,604,152 A | 8/1986 | Luikko | 156/93 |
| 4,613,538 A | 9/1986 | Wendell et al. | 428/198 |
| 4,737,396 A | 4/1988 | Kamat | 428/197 |
| 4,872,870 A | 10/1989 | Jackson | 604/366 |
| 4,880,683 A * | 11/1989 | Stow | 428/200 |

(Continued)

OTHER PUBLICATIONS

Hobbs Heirloom Fusible product literature, 2002.*

(Continued)

Primary Examiner—Terrel Morris
Assistant Examiner—Jennifer Boyd
(74) Attorney, Agent, or Firm—Conley Rose, P.C.; Kristin Jordan Harkin; Albert C. Metrailer

(57) ABSTRACT

A fusible quilt batt. The fusible batt includes a non-woven fibrous web and a heat sealable and releasable adhesive. The adhesive is coated on the outer surface of the web and insinuates between the fibers of the web internally. The adhesive thus binds the fibers of the web and provides a tackiness sufficient to allow the web to be applied to a backing material at an elevated temperature and removed from the backing at room temperature or an elevated temperature. After removal of the web from the backing material it may be reapplied to a backing material at an elevated temperature. The attachment, removal and reattachment process is repeatable.

13 Claims, 1 Drawing Sheet

U.S. PATENT DOCUMENTS

| | | | |
|---|---|---|---|
| 4,909,179 A | 3/1990 | McBride | 116/206 |
| 5,132,163 A | 7/1992 | Leaderman et al. | 428/192 |
| 5,152,018 A | 10/1992 | Lea | 5/420 |
| 5,165,113 A | 11/1992 | Hyams et al. | 2/268 |
| 5,169,469 A | 12/1992 | Feeley | 156/241 |
| 5,368,668 A | 11/1994 | Tochacek et al. | 156/93 |
| 5,459,895 A | 10/1995 | Kikuchi et al. | 5/502 |
| 5,483,713 A | 1/1996 | Kikuchi et al. | 5/502 |
| 5,507,681 A | 4/1996 | Smith et al. | 450/86 |
| 5,552,205 A | 9/1996 | Lea | 428/74 |
| 5,569,344 A | 10/1996 | Grimnes | 156/90 |
| 5,716,687 A * | 2/1998 | Chumbley et al. | 428/41.8 |
| 5,958,802 A | 9/1999 | Wilson | 442/43 |
| 6,261,397 B1 * | 7/2001 | Repp et al. | 156/93 |
| 2002/0182956 A1 | 12/2002 | Repp et al. | 442/149 |
| 2003/0008579 A1 | 1/2003 | Repp et al. | 442/149 |

OTHER PUBLICATIONS

Packaging for the product "Quilter's Fusible Batting" by June Tailor, 2 pages.*

* cited by examiner

FUSIBLE QUILT BATT

CROSS-REFERENCE TO RELATED APPLICATIONS

This application is a continuation-in-part application of U.S. patent application Ser. No. 09/873,597 filed Jun. 4, 2001 now abandoned and hereby incorporated by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to a fusible quilt batt and more particularly to a batt including a non-woven fibrous web and an adhesive such that the web can be applied to, removed from, and reapplied to a backing material.

BACKGROUND OF THE INVENTION

Non-woven fibrous webs are used as a component of quilts. In the process of making a quilt, at least three component layers are typically placed together: (1) a pieced top fabric, (2) a batt, and (3) a backing. The batt is the layer that provides loft to the quilt and is located between the top fabric and the backing. The batt is a non-woven fibrous web and typically includes cotton, polyester, or a combination of cotton and polyester. Additionally, the batt may be made of other fibers, such as wool or rayon.

As described above, the non-woven web of the batt is positioned between the top fabric and the backing of the quilt. The top fabric and/or the backing are then affixed to the batt in order to aid in completing the quilt. For example, pieces of top fabric including patterns for the quilt may be attached to the batt in order that one may draw or cut around the pattern. Additionally, finished patterns may be temporarily positioned on the batt by various methods and subsequently permanently affixed thereto by intricate stitching. Prior to the final intricate stitching, the backing material, the non-woven web of the batt and the top fabric are mechanically bonded together. This mechanical bonding process is known as basting. Some methods of basting include pins, large stitches, and plastic tabs. However, these current methods of basting suffer from several drawbacks.

First, pins are difficult to use in that they are unwieldy and their use is time consuming. For example, should a pattern be incorrectly placed on and pinned to the non-woven fibrous web of the batt, any removal and replacement of the pattern requires the removal and replacement of all pins. Not only is this a time consuming process but the handling of pins can result in a user sticking and injuring himself or herself. Second, large stitches also suffer the drawback of being time consuming due to their relative permanence as a method of fixation. For example, should a pattern be incorrectly placed and stitched to the non-woven web, any correction requires cutting away and removing the large stitches, repositioning the pattern, and reaffixing by stitching. Third, plastic tabs also suffer many of the same drawbacks due to their relative permanence in fixation. These plastic tabs are generally applied by a tab gun which directs the tab through the backing material, batt, and top fabric. Like pins and large stitches, any repositioning of fabric requires the removal and replacement of the plastic tabs.

Other methods of affixation have been developed which do not relatively permanently affix the adjacent surfaces of batt and fabric. However, these methods suffer from other drawbacks. An example of one such method is the use of weights. In this method, a top fabric will be positioned on top of the batt and held in place by weights. Although the weights are not as time consuming or unwieldy to remove and replace as pins or large stitches, there remain several drawbacks associated with their use. First, since the weight system does not directly fix the pattern to the backing material, the pattern may easily shift during use. Second, it is very difficult to cut around patterns upon which weights have been placed, because any movement of the material or the weights may cause the pattern to shift.

It is clear that current methods of affixing top fabrics, batts, and backing materials one to another to form a quilt suffer from many drawbacks. Thus, it would be desirable to have a non-woven fibrous web for a batt that sufficiently adheres to a material backing or fabric patterns without the time consuming problems inherent in pin placement or other methods of basting. Additionally, it would be desirable for such a non-woven web to be easily separated from the backing material or fabric patterns in the event of incorrect placement. Finally, it would be desirable for the non-woven web to easily be readhered to the surrounding fabric following repositioning.

SUMMARY OF THE INVENTION

The present invention provides a fusible quilt batt eliminates the drawbacks of batts of the prior art as developed in the background of the invention. In particular, the present invention provides batt including a non-woven fibrous web having a heat sealable and releasable adhesive disposed in the web and on at least one outer surface of the web. Generally, the adhesive will be disposed on both the upper and lower outer surfaces of the web. This adhesive thus both binds the fibers of the web and provides a tackiness sufficient to allow the web to be applied to, removed from, and reapplied to an adjacent material, such as a quilt backing material or other fabric, by the application of heat and pressure.

In use, the fusible quilt batt of the present invention is placed adjacent to a backing material in a position such that the adhesive on the lower surface of the web contacts a confronting surface of the backing material. Additionally, top fabric for a quilt may be positioned adjacent to adhesive on the upper surface of the web. After positioning the web relative to these adjacent materials, heat and pressure are applied. This softens the adhesive and binds the web to the backing material and/or top fabric. Heat and pressure may be applied by an iron or other method readily apparent to those skilled in the art. Upon cooling, the web and any adjacent material are substantially semi-permanently affixed one to another.

As previously described, the heat-sealable and releasable adhesive is of such a composition that the fusible quilt batt may be separated from the backing material and/or top fabric by peeling apart. The use of heat hastens the process by once again softening the adhesive and allowing the backing material and/or top fabric to be removed from the non-woven web in the event that the backing material and/or top fabric was initially misplaced relative to the web. After removal, the backing material and/or top fabric may be correctly repositioned adjacent to the batt and substantially semi-permanently affixed thereto by the application of heat and pressure. In an alternative embodiment, the adhesive may be disposed on only one surface of the non-woven fibrous web so that the web may be adhered to either a backing material or a top fabric on that one side of the web.

With the fusible quilt batt of the present invention, one may affix the batt to a top fabric and/or backing material of a quilt while eliminating the time consuming and tedious basting methods of the prior art. The present invention also provides a batt which allows the attached fabrics to be easily repositioned if the batt or other fabric was initially misplaced. These and other advantages of the present invention will be apparent from the description thereof.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

Figure 1:
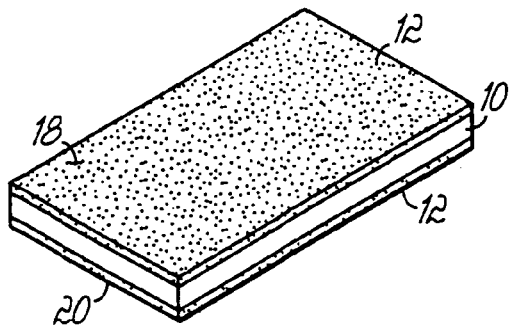
FIG. 1 is a perspective view of a fusible non-woven fibrous web in accordance with the principles of the present invention depicting a single layer of fibers coated with adhesive on both the upper and lower surface thereof.

Referring to the figures, and in particular to FIG. 1, the present invention provides a fusible non-woven fibrous web 10 in accordance with the principles of the present invention. The non-woven web 10 includes a heat-sealable and releasable adhesive 12 which is disposed in the fibers of the web 10 and on at least one surface of the web 10. The portion of the adhesive 12 that is insinuated into the web 10 binds the fibers of the web 10 in order to keep the web 10 intact. Additionally, the portion of the heat sealable and releasable adhesive 12 that is located on the outer surface of the web 10 provides a tackiness sufficient to allow the web 10 to be applied to, removed from, and reapplied to an adjacent surface. In a quilt, the adjacent surface may be located on a backing material 14 or top fabric 16. By allowing for bonding of these fabrics with a heat-sealable and releasable adhesive 12, the present invention overcomes the problems discussed in the background of the invention by eliminating the need for mechanically bonding the top fabric 16, web 10, and backing material 14 together by currently used methods of basting.

The fusible non-woven fibrous web 10 of the present invention includes any fibers known to those skilled in the art for forming non-woven webs 10 that are flexible and can provide loft. More specifically, in particular embodiments of the present invention the fibers of the fusible non-woven fibrous web 10 are selected from cotton, polyester, rayon, and wool, or any combination of those materials. The fibers may be carded into a single layer or, alternatively, may be air blown into a single layer. In other embodiments of the invention, multiple layers may be carded and/or air blown and subsequently placed one on top of another to produce a multilayered non-woven fibrous web. Following its formation, the non-woven web 10 is substantially flat, having an upper surface 18 of relatively large surface area and a lower surface 20 of relatively large surface area.

A heat sealable and releasable adhesive 12 is disposed on at least one of the upper and lower surfaces 18,20 of the non-woven web 10. As the adhesive 12 is applied to the web 10 by any method known to those skilled in the art, at least a portion of the adhesive 12 insinuates into and between the individual fibers of the web 10. In doing so, the adhesive 12 binds the fibers one to another to keep the non-woven web 10 intact. The coating of adhesive 12 disposed on the surface of the web 10 allows the web 10 to be affixed to an adjacent surface. Following application of the adhesive 12 to the web 10, the adhesive 12 remains substantially in the web 10 during removal of the web 10 from and reapplication of the web 10 to the surface of an adjacent material. The adhesive 12 used in the present invention is a thermoplastic and, more specifically, is an acrylic, vinyl acrylic, vinyl acetate, or ethylene vinyl acetate. More particularly, the heat-sealable and releasable adhesive 12 may be selected from but is not limited to the following: Reichold Elvace 40722 (ethylene vinyl acetate), National Starch 25-4401 (ethylene vinyl acetate), Parachem AC 786 (acrylic), Parachem AC 777 (acrylic), Parachem VA 928 (vinyl acetate), Rohm & Haas B-15 (acrylic), Rohm & Haas 3270 (acrylic), or Rohm & Haas Rovene 438 (vinyl acrylic). These adhesives may include other copolymerizable components such as itaconic acid or other similar acids. Either one adhesive 12 or various combinations of adhesives 12 may be used in order to achieve a tackiness that is aggressive enough to bond the fibers of the non-woven web 10 together and to hold the various fibers and layers of the non-woven web 10 intact. At the same time, the tackiness should not be overly aggressive such that a top fabric 16 or backing material 14 cannot be separated from web 10 following their affixation one to another, or such that the web 10 cannot be effectively unrolled after packaging and shipping. In one particular embodiment of the present invention, the heat-sealable and releasable binder disposed in and on the non-woven fibrous web 10 is Parachem AC 786 (acrylic).

Figure 2:
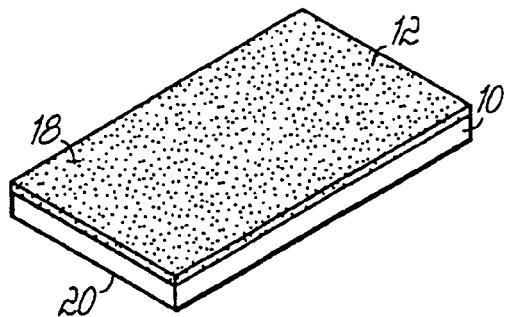
FIG. 2 is a perspective view of a fusible non-woven fibrous web in accordance with the principles of the present invention depicting a single layer of fibers coated with adhesive on the upper surface thereof.

There is also provided a method of making the fusible non-woven fibrous web 10 of the present invention. Referring now to FIG. 2, by this method, the fibers that will comprise a first embodiment of the non-woven web 10 are carded. Next, the heat sealable and releasable adhesive 12 is applied to the upper surface 18 of the web 10. This application of adhesive 12 may be accomplished by any method known to those skilled in the art. Examples of such methods include glazing, print bonding, and spray bonding. As the adhesive 12 is applied to the web 10, a certain amount flows into and becomes insinuated within and between the fibers of the web 10, thereby holding the web 10 together. The remainder of the adhesive 12 coats the upper surface 18 of the web 10 to provide the tackiness that allows the web 10 to be adhered to an adjacent surface, such as a backing material 14 or top fabric 16.

Referring once again to FIG. 1, in a second embodiment of the fusible non-woven fibrous web 10 of the present invention, the individual fibers of the web 10 are carded as a single layer. Next, the heat sealable and releasable adhesive 12 is applied to both the upper surface 18 and the lower surface 20 of the web. This application of adhesive 12 may be accomplished by glazing, print bonding, spray bonding, or any other method known to those skilled in the art. During application, a certain amount of the adhesive 12 insinuates between the fibers of the web 10, to bind those fibers one to another. The remainder of the adhesive 12 coats the upper and lower surfaces 18,20 of the web 10. This allows the web 10 to be adhered to adjacent surfaces on both sides of the web 10, such as a backing material 14 and a top fabric 16.

Figure 3:
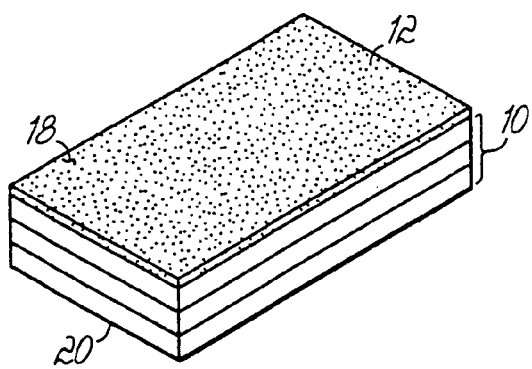
FIG. 3 is a perspective view of a fusible non-woven fibrous web in accordance with the principles of the present invention depicting multiple layers of fibers coated with adhesive on the upper surface thereof.

Referring now to FIG. 3, in a third embodiment of the present invention, multiple layers of fibers may be carded or air-laid, and subsequently layered on top of one another to form the non-woven web 10. Next, the heat sealable and releasable adhesive 12 is applied to the upper surface 18 of the web 10. This application of adhesive 12 may be accomplished by glazing, print bonding, spray bonding, or any other method known to those skilled in the art. During application, a certain amount of the adhesive 12 insinuates between the fibers of each layer of the web 10. The adhesive 12 thus binds the individual fibers of each layer one to another, and binds the multiple layers together. The remainder of the adhesive 12 coats the upper surface 18 of the web 10 to provide the tackiness that allows the web 10 to be adhered to an adjacent surface, such as a backing material 14 or top fabric 16.

More specifically, in this third embodiment of the present invention, a fiber blend of 50% cotton/50% polyester is provided. This fiber blend is first carded on a carding machine. Next, additional webs 10 of 50% cotton/50% polyester are carded. These multiple webs 10 are then laid on a conveyor belt. The total fiber weight of these multiple layers of polyester/cotton fiber blend is approximately 2.12 ounces per square yard. The upper surface 18 of the non-woven fibrous web 10 is then "glazed" with the heat-sealable and releasable adhesive 12. The particular adhesive 12 used in this embodiment is Parachem AC 786 (acrylic) that has been diluted with water to a final composition of approximately 6.67 percent solids. Following cooling the dry weight of the heat sealable and releasable adhesive 12 on the upper surface 18 of the non-woven web 10 is approximately 0.14 ounce per square yard.

As described above, the particular method by which the heat-sealable and releasable adhesive 12 is applied to the non-woven web 10 is by glazing. In the web 10 of the above described embodiment, Parachem AC 786 acrylic is transferred from a bath, up a roll and onto the upper surface 18 of the web 10. This transfer is achieved by surface tension. As the adhesive 12 is applied to the web 10, the majority of the adhesive 12 remains on the upper surface 18 of the non-woven web 10. This creates a smooth facing of the adhesive 12 on the upper surface 18 of the web 10. The adhesive 12 provides the web 10 with its fusible properties which allows a user to be able to affix the non-woven web 10 to a top fabric 16. During the glazing process, a small amount of the heat-sealable and releasable adhesive 12 flows into the web 10 structure. This has the added effect of bonding the fibers of the web 10 one to another and bonding multiple layers of fibers one to another internally.

Figure 4:
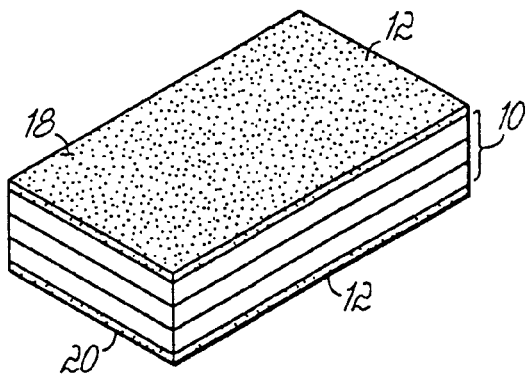
FIG. 4 is a perspective view of a fusible non-woven fibrous web in accordance with the principles of the present invention depicting multiple layers of fibers coated with adhesive on both the upper and lower surface thereof.

After application of the heat-sealable and releasable adhesive 12 to the upper surface 18 of the non-woven fibrous web 10 by glazing, the web 10 including adhesive 12 is passed through an oven in order to heat the adhesive 12. This oven is held at a temperature range of approximately 210° F. to 260° F. The heat provided by the oven drives any water off the non-woven fibrous web 10 and softens the heat-sealable and releasable adhesive 12 in the non-woven web 10 to bind the fibers of the web together. Referring now to FIG. 4, in a fourth embodiment of the fusible non-woven fibrous web 10 of the present invention, the lower surface 20 of the non-woven web 10 of the above described third embodiment may also be coated with the heat-sealable and releasable adhesive 12 by the process of glazing. This glazing process is performed in the same manner as described above for the upper surface 18 of the non-woven web 10. Thus, the total dry weight of the heat sealable and releasable adhesive 12 on both sides of the web 10 will be approximately 0.28 ounces per square yard. After both sides of the web 10 have been glazed and heat set in an oven, the finished web 10 is then rolled and packaged. The total weight of the web 10 is approximately 2.40 ounces per square yard.

In other alternate embodiments of the present invention, the webs 10 may be made of other materials, including but not limited to cotton, polyester, rayon, nylon, and/or wool, or combinations of these fibers. Additionally, the component fibers of the webs 10 may be air laid, and multiple webs 10 may be air laid one on top of the other. Further, the heat-sealable and releasable adhesive 12 may be applied by any method known to those skilled in the art such as by spraying, by saturating the entire web 10 and allowing migration of the adhesive 12 during drying or by applying foamed liquid latex to the surfaces of the web 10 and applying a vacuum to pull a minimal amount of the foamed latex into the web 10 structure to allow for the internal binding of the fibers. Finally, one may use other methods known to those skilled in the art to first bond the fibers of the web 10 together and subsequently apply a heat-sealable and releasable adhesive 12 to at least one outer surface of the web 10.

Figure 5:
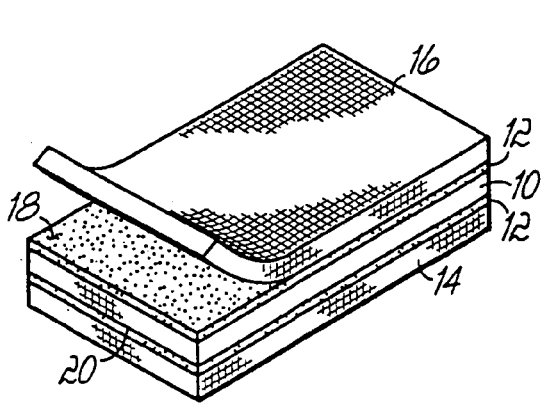
FIG. 5 is a perspective view of the component layers of a quilt depicting a top fabric and a backing material adhered to the fusible non-woven fibrous web of FIG. 1.
Figure 6:
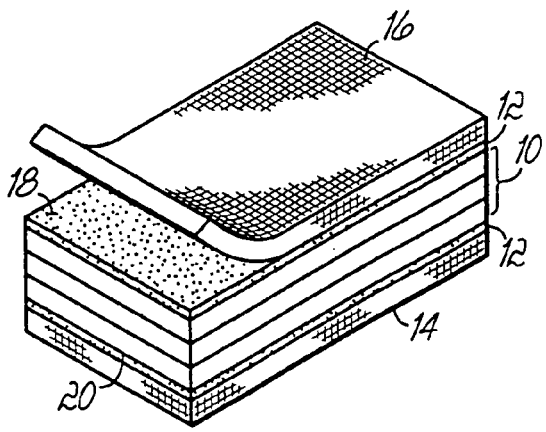
FIG. 6 is a perspective view of an alternate embodiment of the component layers of a quilt depicting a top fabric and a backing material adhered to the fusible non-woven fibrous web of FIG. 4.

In use, and referring now to FIGS. 5 and 6, the fusible non-woven fibrous web 10 of the present invention eliminates the above-described time-consuming methods of basting a quilt. First, the non-woven web 10 is unrolled and/or unfolded to a single layer and cut to the desired size to fit the backing material 14 and/or top fabric 16. In this embodiment, adhesive 12 is disposed on both the upper and lower surfaces 18, 20 of the non-woven web 10. The non-woven web 10 is then placed over the quilt backing material 14 with the lower surface 20 of the non-woven web 10 confronting the backing material 14. Next, patterns of top fabric 16 for a quilt are positioned over the upper surface 18 of the non-woven web 10. Heat and pressure are then applied to the top fabric 16, non-woven web 10, and backing material 14. This application of heat and pressure causes the adhesive 12 to soften and become more tacky, thereby adhering the non-woven web 10 to both the top fabric 16 and the backing material 14. Heat and pressure may be applied by any method, but is generally accomplished by the use of a steam iron.

If the top fabric 16 or backing material 14 is inadvertently misplaced on the web 10, the adjoining components can be separated one from another and reapplied in the correct position. This can be accomplished by peeling apart the web 10 and top fabric 16. The use of heat will hasten the process as the adhesive softens and regains its tackiness. As the temperature of the heat-sealable and releasable adhesive 12 increases, the adhesive 12 softens and regains its tackiness. This allows the top fabric 16 or backing material 14 to be peeled away from the non-woven web 10. The top fabric 16 and/or backing material 14 can then be repositioned and heat and pressure reapplied to the top fabric 16 and web 10 in order to once again affix the adjacent components one to another.

As described above, the adhesives used in embodiments of the invention are preferably thermoplastic. They soften and become more tacky upon heating, but do not cross link. They retain their thermoplastic characteristics. Such adhesives allow a quilt cover to be removed and reattached to a batt a number of times.

After the batt is manufactured as described above, it must be folded and/or rolled for shipping to a sales location. During storage and shipping, the batt may experience elevated temperatures, that is, temperatures substantially above normal room temperature. It is desirable that the adhesive not significantly soften and become tacky during shipping or storage, because the adhesive may bind the folded layers together and prevent unrolling or unfolding without damaging the batt. The adhesive should be selected to have minimal tackiness at the maximum temperatures normally experienced during shipping and storage.

During the manufacturing process described above, the adhesive is exposed to an elevated temperature after it has been applied to the batt. These temperatures are selected to not only drive off the water in the adhesive as applied, but to soften the adhesive so that it binds the fibers of the batt together. After the batt with adhesive is cooled to room temperature, the adhesive should have minimal tackiness so that the batt can then be folded and/or rolled and packaged for shipping without adhering to itself.

After a batt has been purchased by a customer and unrolled, it may again be heated so that the adhesive becomes tacky. In a preferred quilt assembly process, a customer may position a quilt cover on a batt after it has been unrolled. The customer may then apply heat together with pressure on the quilt cover and through the cover to the adhesive to achieve a semi-permanent attachment of the cover to the batt. As suggested above, a conventional steam iron may conveniently heat the adhesive through the cover to an appropriate temperature above the maximum temperature experienced in shipping. Even at this level of attachment, the cover can be peeled from the batt at room temperature. If heat is applied before or during the peeling process, the adhesive can be softened and the cover can be more easily peeled from the batt. A previously attached cover which has been peeled off and repositioned may be again semi-permanently attached to the batt by applying heat and pressure to the cover and batt, e.g. with a steam iron. This attachment, removal, and reattachment process may be repeated as needed to properly position the cover on the batt.

As discussed above, a convenient and preferred method of heating the adhesive to attach and reattach covers to a batt or to remove covers from a batt is use of a steam iron. The moisture provided by a steam iron softens the adhesive more quickly and effectively than a dry iron. This may be a result of better heat transfer by the steam.

While the present invention has been illustrated by the description of various embodiments thereof, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative system and method, and illustrative example shown and described. Accordingly, departures may be made from such details without departing from the spirit or scope of Applicant's general inventive concept.

What is claimed is:

1. A fusible quilt batt comprising:
a non-woven fibrous web selected to provide loft to a quilt; and a heat sealable and releasable thermoplastic adhesive in the web and on at least one outer surface of the web, wherein the adhesive
binds the fibers of the web,
provides at an elevated temperature a tackiness sufficient to attach a quilt cover to the fusible quilt batt,
allows an attached quilt cover to be removed from the fusible quilt batt at room temperature, and
wherein after an attached quilt cover has been removed from the fusible quilt batt, the adhesive provides at an elevated temperature a tackiness sufficient to reattach a quilt cover to the fusible quilt batt.

2. The fusible quilt batt of claim 1, wherein the adhesive remains substantially in the web during removal of an attached quilt cover from the fusible quilt batt.

3. The fusible quilt batt of claim 1, wherein the adhesive is selected from the group consisting of an acrylic, a vinyl acrylic, a vinyl acetate, and an ethylene vinyl acetate.

4. The fusible quilt batt of claim 1, wherein the web includes fiber selected from the group consisting of cotton, polyester, rayon, nylon and wool.

5. The fusible quilt batt of claim 1, wherein the web includes cotton and a polyester.

6. The fusible quilt batt according to claim 1, wherein the adhesive is an acrylic adhesive.

7. The fusible quilt batt of claim 1,
wherein the adhesive has a first level of tackiness as manufactured allowing the fusible quilt batt to be folded onto itself and unfolded without damaging the fusible quilt batt.

8. The fusible quilt batt according to claim 7, wherein the adhesive has a second level of tackiness, greater than the first level, at an elevated temperature.

9. The fusible quilt batt according to claim 8, wherein the elevated temperature is substantially above normal room temperature.

10. The fusible quilt batt according to claim 8, wherein a quilt cover material may be affixed to the fusible quilt batt when the adhesive is at the elevated temperature.

11. The fusible quilt batt according to claim 10, wherein a quilt cover material which has been affixed to the fusible quilt batt when the adhesive is at the elevated temperature may be removed from the fusible quilt batt at an elevated temperature.

12. The fusible quilt batt according to claim 11, wherein after a quilt cover material has been removed from the fusible quilt batt at an elevated temperature, a quilt cover material may be affixed to the fusible quilt batt when the adhesive is at the elevated temperature.

13. The fusible quilt batt according to claim 7, wherein the adhesive is an acrylic adhesive.

* * * * *